United States Patent
Thakker

(12) 
(10) Patent No.: US 6,487,602 B1
(45) Date of Patent: Nov. 26, 2002

(54) SYSTEM AND METHOD FOR ACCESSING THE INTERNET IN AN INTERNET PROTOCOL-BASED CELLULAR NETWORK

(75) Inventor: Kaushal Thakker, Irving, TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/375,611

(22) Filed: Aug. 17, 1999

(51) Int. Cl.[7] .............................................. G06F 15/16
(52) U.S. Cl. ....................... 709/230; 709/227; 709/228; 709/229; 709/246; 709/249; 370/466; 370/469; 455/412; 455/414; 455/466
(58) Field of Search ................................. 709/227, 228, 709/229, 230, 246, 249; 370/466, 469; 455/412, 414, 466

(56) References Cited

U.S. PATENT DOCUMENTS

| | | | |
|---|---|---|---|
| 5,742,668 A | * | 4/1998 | Pepe et al. ................... 455/415 |
| 5,742,905 A | * | 4/1998 | Pepe et al. ................... 455/461 |
| 6,067,451 A | * | 5/2000 | Campana, Jr. et al. ....... 455/412 |
| 6,185,288 B1 | * | 2/2001 | Wong .......................... 379/219 |
| 6,219,694 B1 | * | 4/2001 | Lazaridis et al. ........... 709/206 |
| 6,353,661 B1 | * | 3/2002 | Bailey, III ................ 379/93.25 |
| 6,404,880 B1 | * | 6/2002 | Stevens ................. 379/221.11 |
| 6,411,632 B2 | * | 6/2002 | Lindgren et al. ............ 370/466 |
| 6,421,707 B1 | * | 7/2002 | Miller et al. ................ 709/206 |
| 6,426,955 B1 | * | 7/2002 | Gossett Dalton, Jr. et al. .. 370/401 |

FOREIGN PATENT DOCUMENTS

SE 00/33537 * 6/2000

* cited by examiner

Primary Examiner—Saleh Najjar
(74) Attorney, Agent, or Firm—Jenkens & Gilchrist, P.C.

(57) ABSTRACT

A telecommunications system and method is disclosed for transmitting and receiving short messages between a Mobile Station (MS) within an Internet Protocol (IP) based cellular network and a web site on the Internet. Each web site that the MS has access to contains an Application Program (AP). To retrieve the information, the MS within an IP-based cellular network originates a short message towards the AP associated with the web site using a pre-assigned E.164 number for the AP. When the short message reaches a Mobile Switching Center (MSC), an Application Manager (AM) within the MSC intercepts the short message and translates the E.164 number into an IP-address and port number for the AP. The AM extracts the data from the short-message, packs the data in an SMTP envelope and transmits it to the AP.

22 Claims, 5 Drawing Sheets

SYSTEM AND METHOD FOR ACCESSING THE INTERNET IN AN INTERNET PROTOCOL-BASED CELLULAR NETWORK

BACKGROUND OF THE PRESENT INVENTION

1. Field of the Invention

The present invention relates generally to telecommunications systems and methods for sending and receiving short messages by a mobile station, and specifically to accessing the Internet in an internet-protocol based cellular network by sending and receiving short messages.

2. Background of the Present Invention

With the increasing use of the Internet Protocol (IP) for delivering voice traffic across systems, some cellular networks have begun to implement IP internally. The IP packetizes voice and data for transmission within and between systems, and provides the benefit of shared bandwidth. Thus, instead of reserving a specific circuit for each call, as in conventional circuit-switched cellular networks, the voice and data for all calls in an IP-based cellular network can be transmitted together through the network.

Many mobile subscribers are beginning to access the Internet remotely using their Mobile Stations (MSs). However, because the air interface used for transmitting voice and data to and from MSs still relies upon circuit-switched technology, the mobile subscribers must attach a computer to their MS or purchase an MS with a built-in computer in order to access the Internet. The reason that IP cannot be used on the air interface is that a separate channel (or frequency) must be used for each MS. Therefore, all voice and data sent to and from the MS in an IP-based cellular network must be converted between packet-switched, which is used by the network, and circuit-switched, which is used by the MS.

For example, in order for a mobile subscriber within an IP-based cellular network to access the Internet, the mobile subscriber must first establish a call connection with an Internet Service Provider (ISP) within the circuit-switched network, which provides a connection to the Internet. This is accomplished by the MS transmitting a call setup message, including the B-number for the ISP to a Gatekeeper within the IP-based cellular network. Thereafter, the Gatekeeper establishes the connection between the mobile subscriber and the ISP via a Gateway to the circuit-switched network, using this B-number. Once the connection to the ISP has been established, the ISP provides an IP address to the mobile subscriber, which allows the mobile subscriber to browse the web and send and receive electronic messages.

To access a particular web site on a server on the Internet, the mobile subscriber must enter an IP address and port number for that web site on their computer and transmit this IP address and port number to the ISP via the IP-based cellular network and the Gateway. All data is passed between the web site and the computer associated with the mobile subscriber via the ISP, Gateway, IP-based cellular network and the MS attached to the computer.

This connection process is cumbersome, since there is a need to connect a laptop computer or purchase an MS with a computer built-in. In addition, the mobile subscriber must register with an ISP to access the Internet, which is costly for the mobile subscriber. Currently, there is not a way for the MS itself to access a web site on the Internet directly through the IP-based cellular network without the need for an attached or built-in computer or an ISP.

SUMMARY OF THE INVENTION

The present invention is directed to telecommunications systems and methods for allowing a Mobile Station (MS) within an IP-based cellular network to directly access a web site on the Internet by using a modified Simple Mail Transfer Protocol (SMTP). Each web site that the MS has the ability to access contains a new Application Program (AP) for receiving a request for information from the MS and providing the requested information back to the MS. Such information can include, for example, real-time stock quotes, sports scores, air/train schedules, mobile banking and even E-commerce capabilities. To retrieve the information from the web site, the MS within the IP-based cellular network originates a short message towards the AP associated with the web site using a pre-assigned E.164 number for the AP. When the short message reaches a Mobile Switching Center (MSC) within the IP-based cellular network, a new Application Manager (AM) within the MSC intercepts the short message and translates the E.164 number into an IP-address and port number for the AP. In addition, the AM extracts the short message data (information request) from the short message, packs the short message data in an SMTP envelope and transmits the short message data to the AP using a modified SMTP protocol. Once the AP receives the short message data within the SMTP envelope, the AP extracts the short message data from the SMTP envelope, retrieves the requested information and delivers the information back to the AM in the MSC. To send the information to the MS, the AM within the MSC converts the information into another short message, pages the MS and delivers the short message containing the requested information to the MS.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
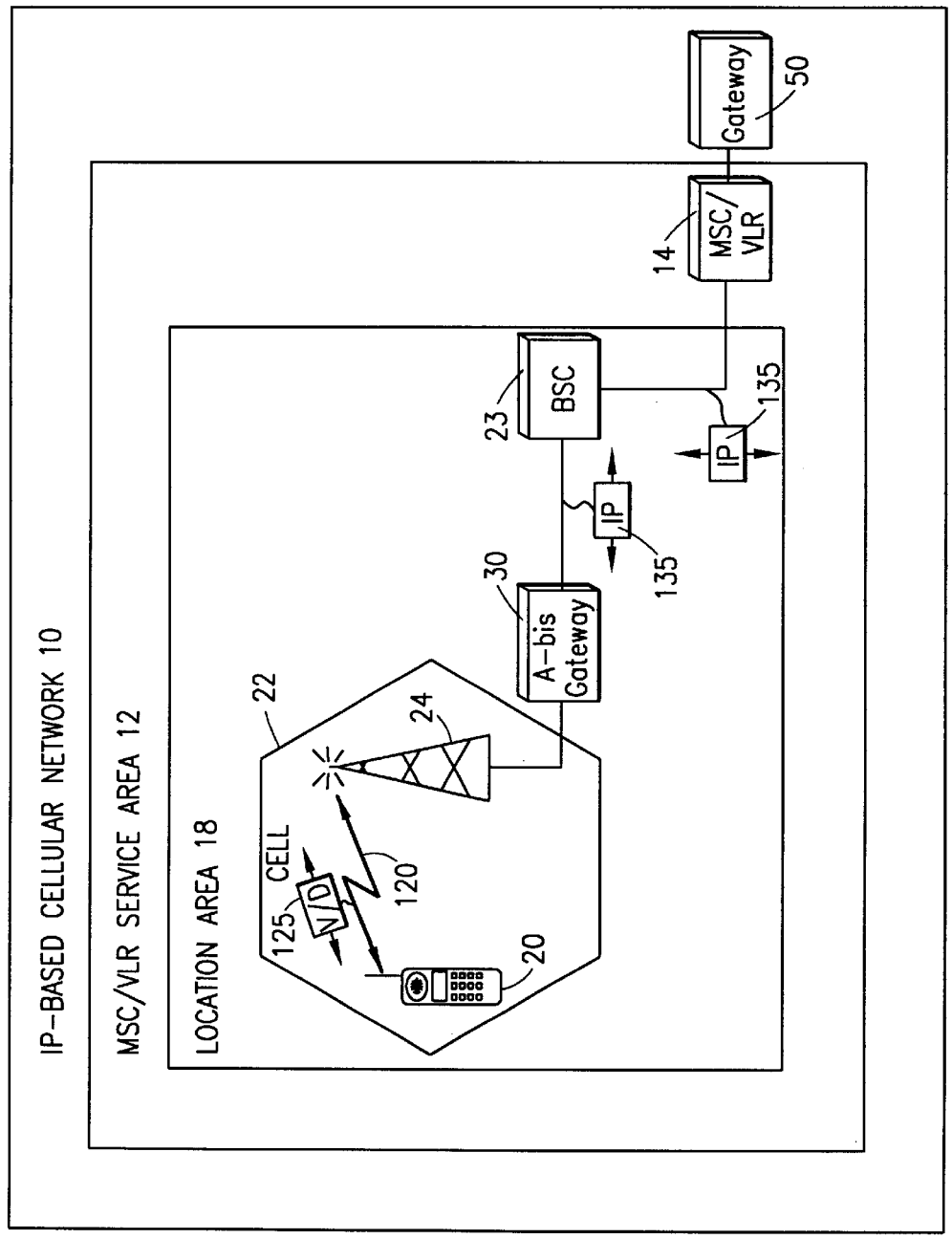
FIG. 1 is a block diagram of a conventional Internet Protocol (IP) based cellular network.

With reference now to FIG. 1 of the drawings, there is illustrated a sample Internet Protocol (IP) based cellular network 10, such as a cellular network based on the H.323 architecture, which is composed of a plurality of areas 12, each with a Mobile Switching Center (MSC) and an integrated Visitor Location Register (VLR) 14 therein. The MSC/VLR areas 12, in turn, include a plurality of Location Areas (LA) 18, which are defined as that part of a given MSC/VLR area 12 in which a Mobile Station (MS) 20 may move freely without having to send update location information to the MSC/VLR 14 that controls the LA 18. Each LA 18 is further divided into a number of cells 22.

The MS 20 is the terminal equipment, e.g., a car phone or other portable phone, used by mobile subscribers to communicate with the cellular network 10, each other, and users outside the subscribed network, both wireline and wireless. The MS 20 is in communication with the MSC/VLR 14 via a Base Transceiver Station (BTS) 24 and a serving Base Station Controller (BSC) 23. The BTS 24 is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC/VLR 14.

In such an IP-based cellular network 10, voice and/or data 125 are transmitted between the MS 20 and the MSC/VLR 14 using voice over IP. Thus, the voice and/or data 125 sent from the MS 20 to the BTS 24 over the air interface 120 is converted by an A-bis Gateway 30 associated with the BTS 24 from the circuit-switched format used by the MS 20 into IP packets 135 in a packet-switched format used by the IP-based cellular network 10. Once the voice and/or data 125 has been converted into the IP packets 135, the A-bis Gateway 30 routes the IP packets 135 to the MSC/VLR 14. Upon receipt of the IP packets 135, the MSC/VLR 14 routes the IP packets 135 to to the called party (not shown). If, for example, the called party is not within the IP-based cellular network 10, the MSC/VLR 14 routes the IP packets 135 to a Gateway 50 for conversion of the IP packets 135 back into the circuit-switched voice and/or data 125.

Figure 2:
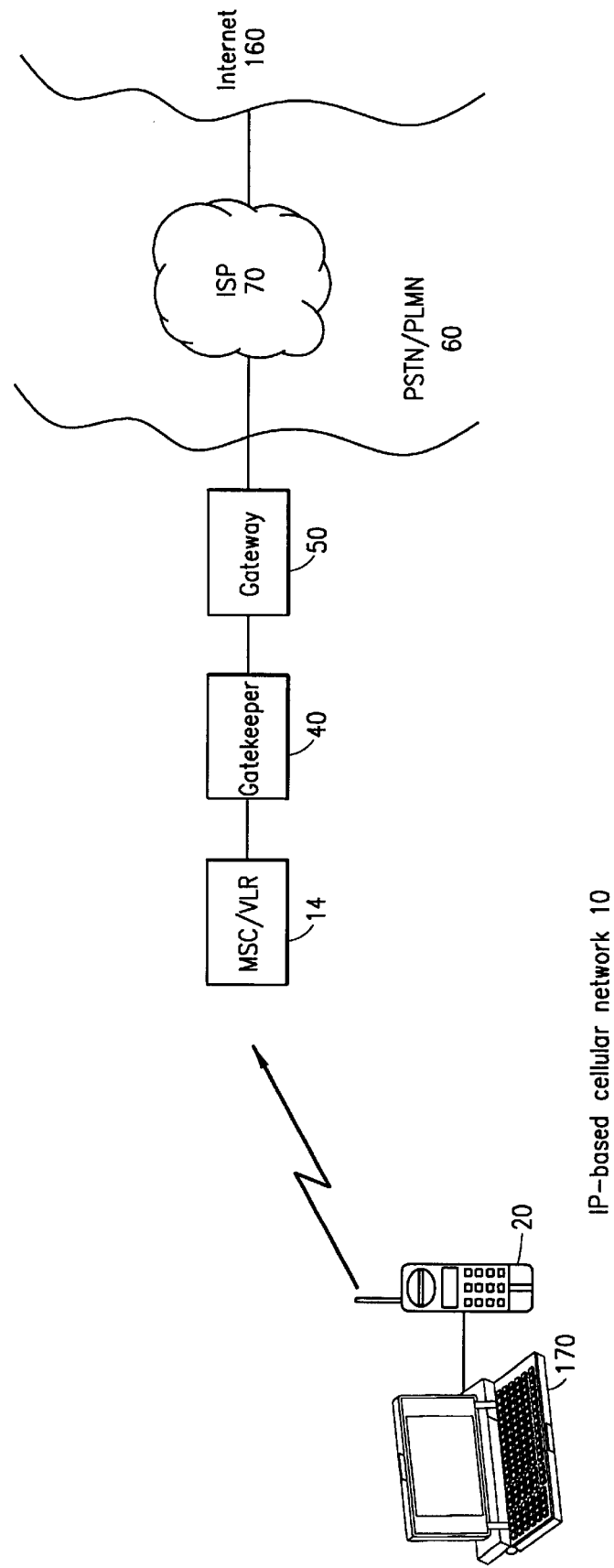
FIG. 2 illustrates a conventional way of accessing the Internet in an IP-based cellular network.

As shown in FIG. 2 of the drawings, many mobile subscribers are currently remotely accessing an Internet 160 using a laptop computer 170 attached to their MS 20. Remote access occurs in much the same way as accessing the Internet 160 through a wireline terminal. The mobile subscriber enters a B-number (or E.164 number) for an Internet Service Provider (ISP) 70 on their laptop 170, and the MS 20 attached to the laptop 170 establishes a call connection with the ISP 70, which provides access to the Internet 160. The connection between the MS 20 and the ISP 70 is through the MSC/VLR 14 and H.323 Gatekeeper 40 in the IP-based cellular network 10 and the Gateway 50 to the PLMN/PSTN 60. It would be beneficial to allow the MS 20 to directly access the Internet 160 without the need for an attached computer 170 or an ISP 70.

Figure 3:
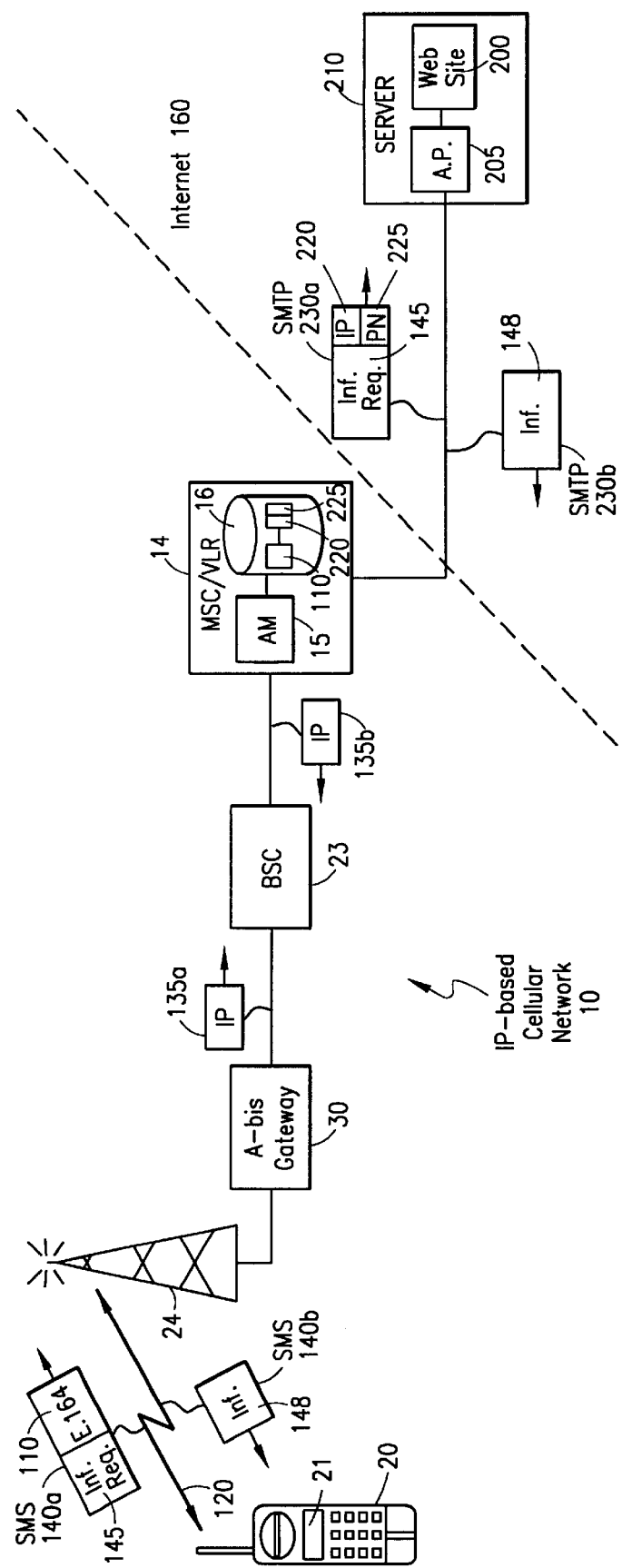
FIG. 3 illustrates the sending and receiving of information between an MS within an IP-based cellular network and an Application Program residing on a server within the Internet using short messages and a modified Simple Mail Transfer Protocol, in accordance with embodiments of the present invention.

Therefore, with reference now to FIG. 3 of the drawings, in accordance with preferred embodiments of the present invention, in order to transmit and receive information between an MS 20 within an IP-based cellular network 10 and a web site 200 on a server 210 connected to the Internet 160, a new functional component herein referred to as an Application Manager (AM) 15 can be included within the MSC/VLR 14. The AM 15 accesses a database 16 within either the MSC/VLR 14 or a separate node, the former being shown, to cross-correlate E.164 numbers 110 (dialable numbers) with IP addresses 220 for specific web sites 200.

Each web site 200 that is accessible by the MS 20 has an E.164 number 110 associated therewith. This E.164 number 110 translates into an IP address 220 of the web site 200 and a specific port number 225 for a new Application Program (AP) 205 associated with the web site 200. The AP 205 receives requests 145 for information 148 from MSs 20, retrieves the requested information 148 and transmits this information 148 back to the MSs 20 that requested the information 148 over the air interface 120.

In order to request specific information 148, such as real-time stock quotes, sports scores, air/train schedules, mobile banking or E-commerce capabilities, from a web site 200 on the Internet 160, the MS 20 can transmit a mobile originated short message 140a to the E.164 number 110 associated with the AP 205 of the web site 200. This short message 140a is received by the BTS 24 and converted into IP packets 135a by the A-bis Gateway 30 for transmission to the MSC/VLR 14 via the BSC 23. The short message 140a can be, for example, a Short Message Service (SMS) message, which is a short text message, containing up to 160 alpha numeric characters. It should be understood that SMS messages 140 are transmitted to and from the MS 20 through the MSC/VLR 14, BSC 23 and BTS 24 over an allocated signaling channel, such as a Stand alone Dedicated Control channel (SDCCH).

Typically, in order to send an SMS message 140, the MS 20 within the IP-based cellular network 10 must transmit not only the E.164 number 110 associated with the receiving node, but also an address for an SMS Service Center (SC) (not shown) within the Public Land Mobile Network (PLMN) (not shown). When the E.164 number 110 and associated SMS message 140 is received at the MSC/VLR 14, the MSC/VLR 14 uses the address for the SC to transmit the SMS message 140 and associated E.164 number 110 to the SC within the PLMN via the Gateway 50 and an SMS-Interworking MSC (SMS-IWMSC) (not shown) within the PLMN. The SC serves as a store-and-forward node for SMS messages 140. Thereafter, the SC forwards the SMS message 140 to the receiving node.

However, since the receiving node is the AP 205 associated with the web site 200, and the Internet does not use the Short Message Service, the AP 205 will not be able to receive the SMS message 140a. Therefore, when the MSC/VLR 14 receives the IP packets 135a containing the SMS message 140a, the AM 15 within the MSC/VLR 14 intercepts the SMS message 140a and accesses the database 16 to translate the E.164 number 110 into the IP address 220 and port number 225 of the AP 205. In addition, the AM 15 extracts the short message data (information request 145) from the SMS message 140a, packs this short message data 145 in a Simple Mail Transfer Protocol (SMTP) envelope 230a and sends the SMTP envelope 230a containing the short message data 145 to the AP 205 using a modified SMTP protocol of the type used in the Internet 160.

The modified SMTP transport protocol is identical to the conventional SMTP transport protocol except that the port number, labeled 225, used by the modified SMTP is different than the conventional SMTP port number. Conventionally, the port number "25," which is reserved for E-mail messaging, is used by the SMTP transport protocol. With the modified SMTP protocol, a different, well-known port number is used. It should be understood that SMTP is based upon Transmission Control Protocol over Internet Protocol (TCP/IP), and is a standard and widely accepted protocol for transfer of text messages.

When the AP 205 receives the SMTP envelope 230*a*, the AP 205 extracts the short message data (information request 145) from the SMTP envelope 230*a*, processes the information request 145 and accesses the web site 200 to retrieve the requested information 148. Thereafter, the AP 205 packs the requested information 148 into another SMTP envelope 230*b* and sends this SMTP envelope 230*b* back to the AM 15 within the MSC/VLR 14.

The AM 15 within the MSC/VLR 14, in turn, extracts the requested information 148, and the MSC/VLR 14 pages the MS 20 and sends this requested information 148 back to the MS 20 in a mobile terminated SMS message 140*b*. It should be noted that the MSC/VLR 14 sends the requested information 148 as IP packets 135*b* to the A-bis Gateway 30, which converts the IP packets 135*b* into the mobile terminated SMS message 140*b* and transmits the mobile terminated SMS message 140*b* to the MS 20 via the BTS 24 over the air interface 120. The requested information 148 is displayed to the mobile subscriber on a display 21 of the MS 20.

Figure 4:
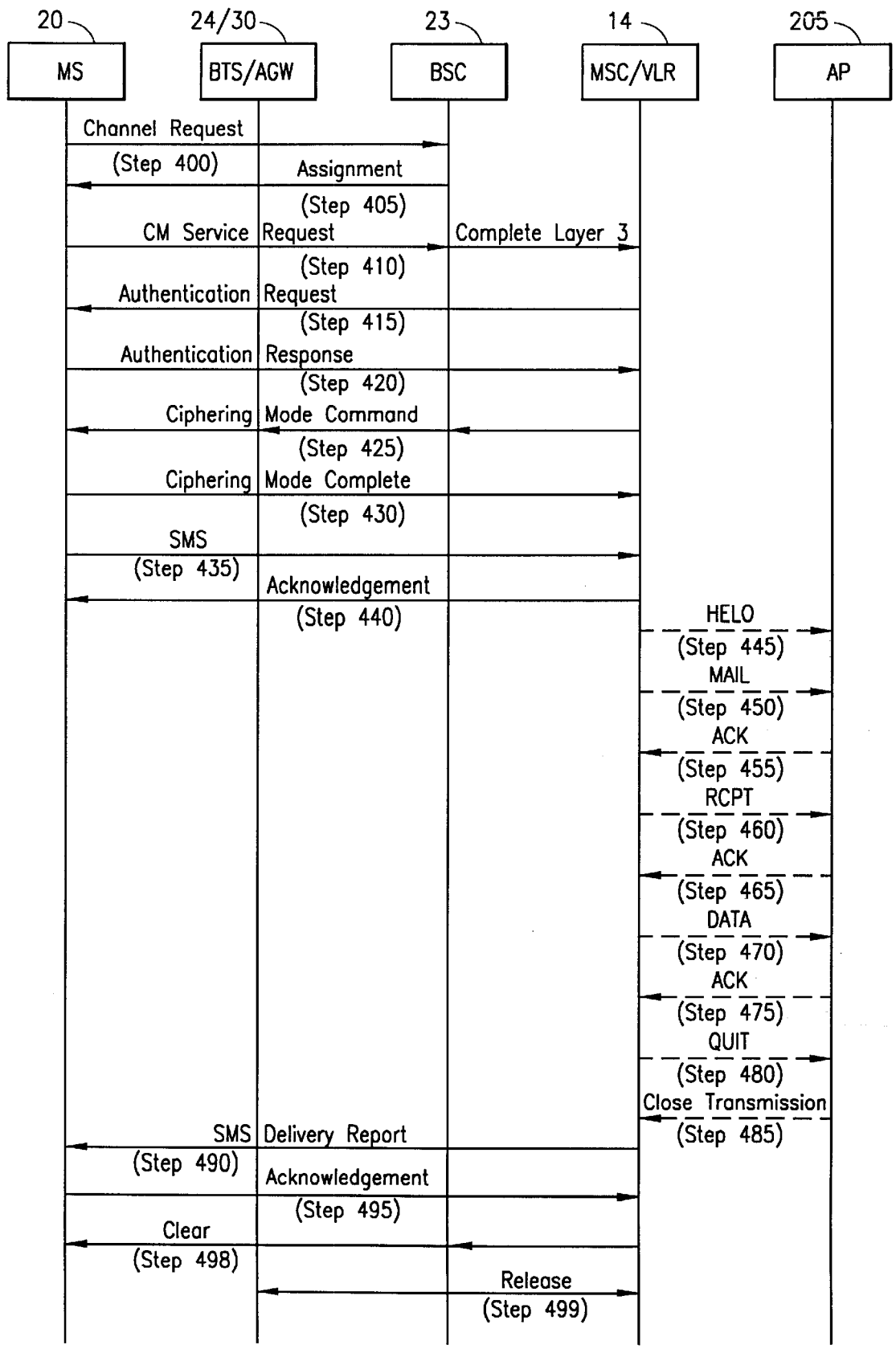
FIG. 4 is a signaling diagram illustrating the signaling involved in the sending of a request for information from the MS to the Application Program on a server within the Internet, in accordance with embodiments of the present invention.

A more detailed implementation of the present invention is shown in the signaling diagrams of FIGS. 4 and 5 of the drawings, which will be described in connection with the diagram shown in FIG. 3 of the drawings. As shown in FIG. 4, in order for the MS 20 to originate an SMS message 140*a* to a specialized AP 205 associated with a web site 200 residing on a server 210 connected to the Internet 160, the MS 20 must first request a signaling channel (step 400), such as a Stand alone Dedicated Control channel (SDCCH), from the BSC 23. Once the BSC 23 assigns an SDCCH to the MS 20 (step 405), the MS 20 sends a CM Service Request message to the MSC/VLR 14, which the MSC/VLR 14 receives in a Complete Layer 3 message from the BSC 23 (step 410). The CM Service Request message informs the MSC/VLR 14 that the MS 20 wants to send an SMS message 140*a*. After authentication of the MS 20 (steps 415 and 420), and the determination of a ciphering mode (steps 425 and 430), the MS 20 transmits the mobile originated SMS message 140*a* with the pre-assigned E.164 number 110 associated with the AP 205 of the web site 200 to the MSC/VLR 14 (step 435). Upon receipt of the SMS message 140*a*, the MSC/VLR 14 provides an acknowledgment message to the MS 20 (step 440).

Thereafter, the AM 15 within the MSC/VLR 14 must translate the E.164 number 110 into the unique IP address 220 and port number 225 of the AP 205 associated with the web site 200, extract the short message data (information request 145) from the SMS message 140*a* and deliver the information request 145 to the AP 15 using the modified SMTP, as discussed above. In order to deliver the SMTP envelope 230*a* to the AP 205, various SMTP commands can be used. To establish the connection with the AP 205, the MSC/VLR 14 first sends a HELO command (step 445), which identifies the MSC/VLR 14 to the AP 205. The HELO command is followed by the fully qualified domain name of the MSC/VLR 14, e.g., mscl.org. Thereafter, the MSC/VLR 14 transmits a MAIL command (step 450), which identifies the originator of the message. The AM 15 appends the MSISDN of the MS 20 that originated the SMS message 140*a* to this field, e.g., 2145551212@mscl.org.

Once the AP 205 provides the MSC/VLR 14 with an indication to proceed (step 455), the MSC/VLR 14 follows the MAIL command with a RCPT command (step 460), which identifies the recipient of the message (the AP 205 associated with the particular web site 200 on the server 210), e.g., stockquotes@server.com. After the AP 205 has confirmed that the recipient is correct (step 465), the MSC/VLR 14 forwards a DATA command to the AP 205 (step 470), which is followed by the SMTP envelope 230*a* containing the information request 145 sent by the MS 20.

Thereafter, the AP 205 sends an acknowledgment message back to the MSC/VLR 14 (step 475) using the address included in the MAIL command, e.g., 2145551212@mscl.org. Upon receipt of the acknowledgment message, the MSC/VLR 14 transmits a QUIT command to the AP 205 (step 480), which terminates the exchange between the MSC/VLR 14 and the AP 205 (step 485). In addition, the AM 15 within the MSC/VLR 14 extracts the MS's 20 MSISDN from the address, and the MSC/VLR 14 pages the MS 20 and delivers an SMS delivery report, indicating that the SMS message 140*a* was delivered to the AP 205, back to the MS 20 (step 490). To complete the transmission, the MS 20 acknowledges the receipt of the SMS delivery report to the MSC/VLR 14 (step 495), which, in turn, orders the BSC 23 and BTS 24 to clear the SDCCH assigned to the MS 20 (steps 498 and 499).

When the AP 205 receives the request 145, the AP 205 processes the request 145 and retrieves the requested information 148. To send the requested information 148 back to the MS 20, the AP 205 must send an SMTP envelope 230*b* containing the information 148 to the MSC/VLR 14 within the IP-based cellular network 10, which will use the SMS procedure to forward the information 148 to the MS 20. It should be noted that the original request 145 may be a request 145 to send the requested information 148 multiple times or to multiple subscriber. For example, the MSC/VLR 14 may provide daily stock quotes to all of the subscribers in the area served by the MSC/VLR 14, or a particular subscriber may want to have daily stock quotes without re-sending a new request 145 each time. Thus, the original request 145 sent by the MS 20 or MSC/VLR 14 can contain an indication to routinely send updated information 148 at regular time intervals.

Figure 5:
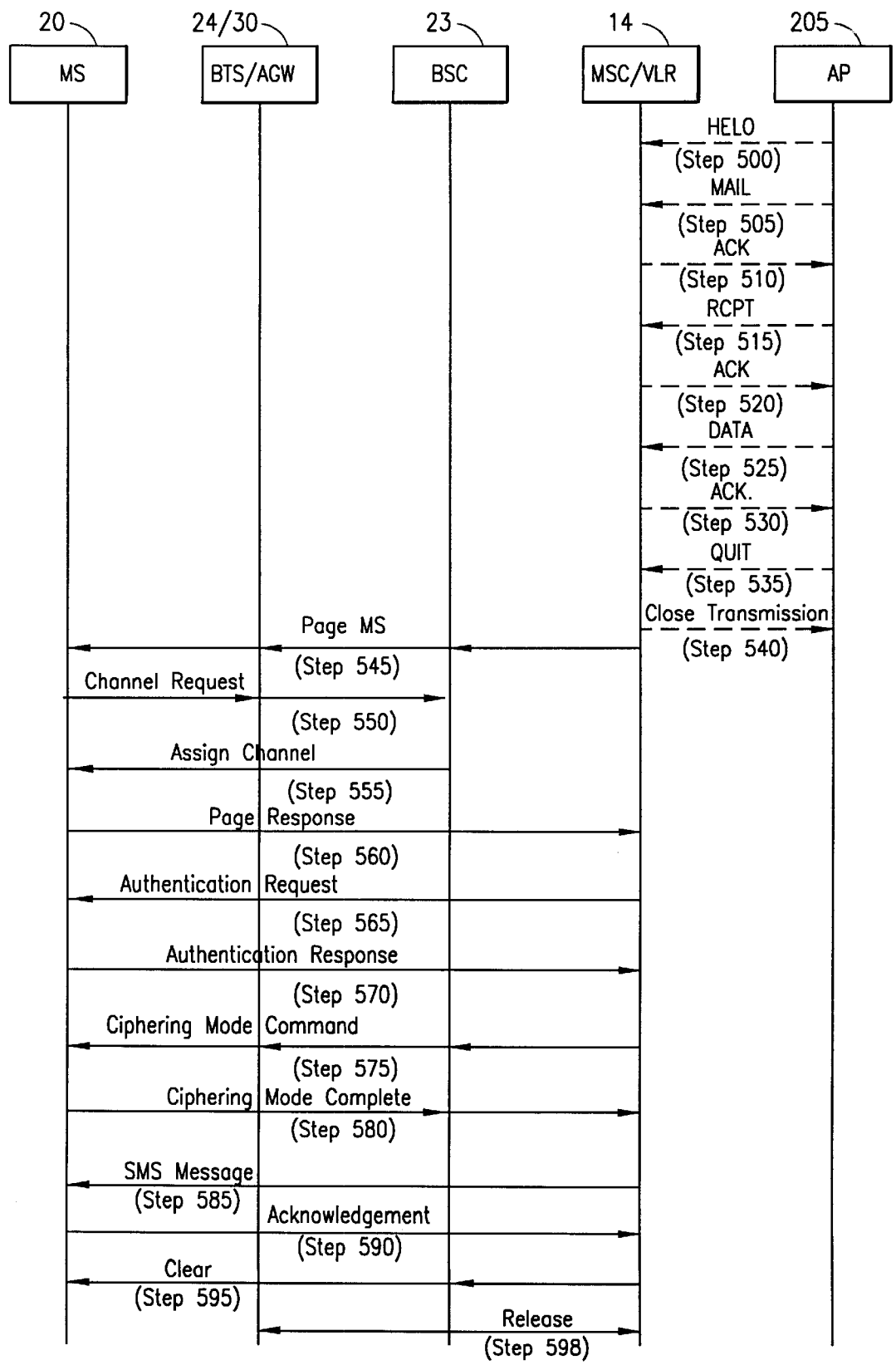
FIG. 5 is a signaling diagram illustrating the signaling involved in the sending of information from the Application Program to the MS, in accordance with embodiments of the present invention.

With reference now to FIG. 5 of the drawings, to send the requested information 148 back to the MSC/VLR 14, the AP 205 must send the HELO command to the MSC/VLR 14 (step 500). The HELO command is followed by the fully qualified domain name of the AP 205, e.g., server.com. Thereafter, the AP 205 transmits the MAIL command (step 505), which identifies the originator of the message, e.g., stockquotes@server.com.

Once the MSC/VLR 14 provides the AP 205 with an indication to proceed (step 510), the AP 205 follows the MAIL command with a RCPT command (step 515), which identifies the recipient of the message. For example, the recipient can be the particular MS 20 that the information 148 is for or if the information is to be sent to multiple MSs 20, the recipient could be the AM 15 within the MSC/VLR 14, e.g., am@mscl.org. After the MSC/VLR 14 has confirmed that the recipient is correct (step 520), the AP 205 forwards a DATA command to the MSC/VLR 14 (step 525), which is followed by the SMTP envelope 230*b* containing the requested information 148.

Thereafter, the MSC/VLR 14 confirms receipt of the SMTP envelope 230*b* (step 530), and the AP 205 transmits a QUIT command to the MSC/VLR 14 (step 535), which terminates the exchange between the MSC/VLR 14 and the AP 205 (step 540). At this time, the AM 15 within the MSC/VLR 14 extracts the MS's 20 MSISDN from the address, and the MSC/VLR 14 pages the MS 20 (step 545). When the MS 20 detects the paging message, the MS 20 sends a request for a signaling channel (step 550) to the BSC 23.

In response, the BSC 23 assigns a signaling channel (step 555), and the MS 20 uses the signaling channel to send a Page Response message to the MSC/VLR 14 (step 560). After authentication of the MS 20 (steps 565 and 570), and the determination of a ciphering mode (steps 575 and 580), the MSC/VLR 14 delivers a mobile terminated SMS message 140b containing the requested information 148 back to the MS 20 (step 585). To complete the transmission, the MS 20 acknowledges the receipt of the SMS message 140b to the MSC/VLR 14 (step 590), which, in turn, orders the BSC 23 and BTS 24 to clear the SDCCH assigned to the MS 20 (steps 595 and 598).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A mobile switching center within an Internet Protocol based cellular network for accessing a site within the Internet, comprising:
    a database for storing an E.164 number associated with said site and an associated Internet Protocol address and port number; and
    an application manager for intercepting a mobile originated short message from a mobile station in wireless communication with said mobile switching center, said short message being addressed to said E.164 number, said application manager further for accessing said database to translate said E.164 number into said Internet Protocol address and port number associated with said site, enclosing said short message into a Simple Mail Transport Protocol (SMTP) envelope and transmitting said SMTP envelope directly to said Internet Protocol address and port number associated with said site through the Internet.

2. The mobile switching center of claim 1, wherein said short message contains data, said application manager further for extracting said data and packing said data into said SMTP envelope.

3. The mobile switching center of claim 2, wherein said data is a request for information from said site.

4. The mobile switching center of claim 3, wherein said port number is for a specific application program associated with said site.

5. The mobile switching center of claim 4, wherein said application manager further receives an additional SMTP envelope containing said requested information, extracts said requested information and sends said requested information to said mobile station in a mobile terminated short message.

6. A telecommunications system for retrieving information from a web site on the Internet, comprising:
    a mobile station within an Internet Protocol based cellular network for sending a mobile originated short message containing a request for information to an E.164 number associated with said web site;
    a mobile switching center in wireless communication with said mobile station for intercepting said short message, translating said E.164 number into an Internet Protocol address and port number associated with said site, enclosing said short message into a first Simple Mail Transport Protocol (SMTP) envelope and transmitting said first SMTP envelope directly to said Internet Protocol address and port number associated with said site through the Internet; and
    a server within the Internet having said web site associated therewith, said server for receiving said first SMTP envelope, retrieving said requested information from said web site and sending said requested information back to said mobile station within a second SMTP envelope via said mobile switching center.

7. The telecommunications system of claim 6, wherein said server has an application program associated with said web site therein for receiving said first SMTP envelope, retrieving said requested information and transmitting said second SMTP envelope.

8. The telecommunications system of claim 6, wherein said first SMTP envelope has a return address associated therewith, said second SMTP envelope being addressed to said return address.

9. The telecommunications system of claim 8, wherein said return address is a mobile station identity associated with said mobile station.

10. The telecommunications system of claim 9, wherein said mobile station identity includes a directory number associated with said mobile station and an Internet Protocol address associated with said mobile switching center serving said mobile station.

11. The telecommunications system of claim 6, wherein said mobile switching center receives said second SMTP envelope, extracts said requested information and sends said requested information to said mobile station in a mobile terminated short message.

12. The telecommunications system of claim 6, wherein said mobile switching center includes an application manager for translating said E.164 number into said associated Internet Protocol address and port number.

13. The telecommunications system of claim 12, further comprising:
    a database for storing said E.164 number and said associated Internet Protocol address and port number, said application manager accessing said database to retrieve said Internet Protocol address and port number associated with said E.164 number.

14. The telecommunications system of claim 13, wherein said database is located within said mobile switching center.

15. The telecommunications system of claim 6, further comprising:
    an A-bis gateway within said Internet Protocol based cellular network for converting said mobile originated short message into Internet Protocol packets and delivering said Internet Protocol packets to said mobile switching center.

16. A method for accessing the Internet within an Internet Protocol based cellular network, comprising the steps of:
    sending a mobile originated short message to an E.164 number associated with a web site on the Internet from a mobile station within said Internet Protocol based cellular network to a mobile switching center in wireless communication with said mobile station;
    translating said E.164 number into an Internet Protocol address and port number associated with said site;
    enclosing said short message into a first Simple Mail Transport Protocol (SMTP) envelope; and
    transmitting said first SMTP envelope from said mobile switching center to said Internet Protocol address and port number associated with said web site through the Internet.

17. The method of claim 16, wherein said short message contains a request for information from said site and said port number is for an application program associated with said site, and further comprising the steps of:
- receiving at an application program associated with said web site on a server connected to the Internet said first SMTP envelope;
- retrieving said requested information from said web site; and
- transmitting said requested information back to said mobile station within a second SMTP envelope via said mobile switching center.

18. The method of claim 17, wherein said step of transmitting said requested information further comprises the steps of:
- extracting said requested information from said second SMTP envelope; and
- sending said requested information to said mobile station from said mobile switching center in a mobile terminated short message.

19. The method of claim 17, wherein said first SMTP envelope has a return address associated therewith, said step of transmitting said second SMTP envelope further comprising the step of:
- addressing said second SMTP envelope to said return address.

20. The method of claim 19, wherein said return address includes a directory number associated with said mobile station and an Internet Protocol address associated with said mobile switching center serving said mobile station, said step of transmitting said second SMTP envelope further comprising the step of:
- transmitting said second SMTP envelope to said mobile switching center using said Internet Protocol address.

21. The method of claim 16, wherein said step of translating said E.164 number further comprises the steps of:
- accessing a database storing said E.164 number and said associated Internet Protocol address and said port number; and
- retrieving said Internet Protocol address and said port number associated with said E.164 number from said database.

22. The method of claim 16, wherein said step of sending said mobile originated short message further comprises the steps of:
- receiving at an A-bis gateway in wireless communication with said mobile station said mobile originated short message;
- converting said mobile originated short message into Internet Protocol packets; and
- delivering said Internet Protocol packets to said mobile switching center.

* * * * *